Dec. 3, 1968     S. GALLI DE PARATESI ETAL     3,414,476
LIQUID POISON SAFETY SYSTEM FOR A NUCLEAR REACTOR
Filed March 9, 1967     3 Sheets-Sheet 1

3,414,476
LIQUID POISON SAFETY SYSTEM FOR A
NUCLEAR REACTOR
Sergio Galli de Paratesi, Varese, Francois Genet, Ispara, Luciano Ghiurghi, Varese, Alberto Agazzi, Bergamo, and Mario Morbello, Besozzo, Italy, and Armando Broggi, Santa Fe, Argentina, assignors to European Atomic Energy Community (Euratom), Brussels, Belgium
Filed Mar. 9, 1967, Ser. No. 621,893
Claims priority, application Belgium, Mar. 22, 1966, 25,619
6 Claims. (Cl. 176—86)

ABSTRACT OF THE DISCLOSURE

In a nuclear reactor, a system for selectively introducing a poison solution to stop the reactor or a washing solution to clean the system. The system includes a plurality of vertical rods in the reactor connected to top and bottom headers located on the respective ends of the reactor. An accumulator is connected to both of the headers and to valve means which selectively introduces the poison solution or washing solution.

---

The invention relates to a system of safety rods for the stopping of a nuclear reactor (e.g. in an emergency) by introduction of a solution of neutronic poison, into tubes passing vertically through the reactor core. Such a system should be capable of operating without fail at a speed appropriate to an emergency trip of the reactor and it is also desirable to be able, without impeding the normal operation of the entire system, to carry out washing operations by circulating suitable liquid in rods that are not in operation, to remove from the walls of those rods the deposits of poison or other impurities that might be attached to them.

The invention provides, in a nuclear reactor, a system of safety rods operable to stop the reactor comprising a set of hollow rods, which pass vertically through the reactor core and open above the core in a top header and below the core in at least one bottom header, the latter being connected through a valve to a poison-solution accumulator or reservoir, which has at the upper end an inlet for pressure driving gas used to drive the poison solution to the bottom header and the rods opening into it, the movement of the solution being stopped by hydrodynamic brakes, the accumulator being such that the driving gas is prevented from bubbling in the safety rods and being connected by a set of valves and a pump to a poison-solution reservoir and, also by means of a set of valves and a pump, to a washing-liquid reservoir, so that poison solution or washing liquid can be circulated in the accumulator and in the rods communicating with it, the circuit for the circulation of the washing liquid terminating at a washing-residue reservoir, the poison-solution circuit being closed by the connection, by means of valves, of the pipes for emptying the top header to the solution reservoir and the poison-solution pump, the top header being such that washing water can circulate in some of the rods, while the others, which are numerous enough to stop the reactor, may be filled with poison solution.

Figure 1:
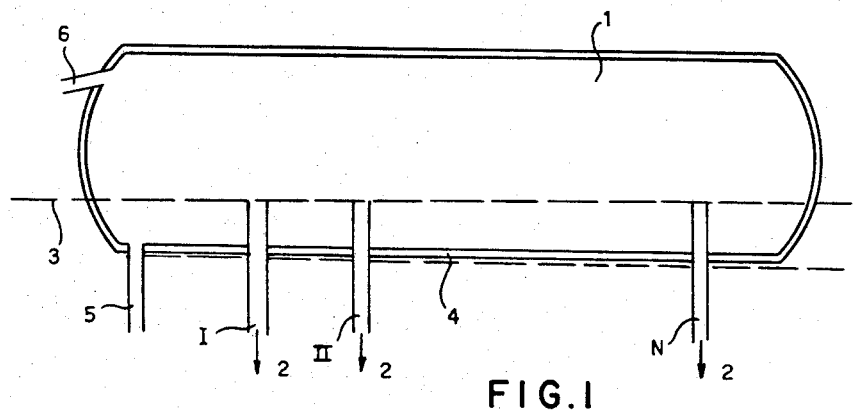
Figure 2:
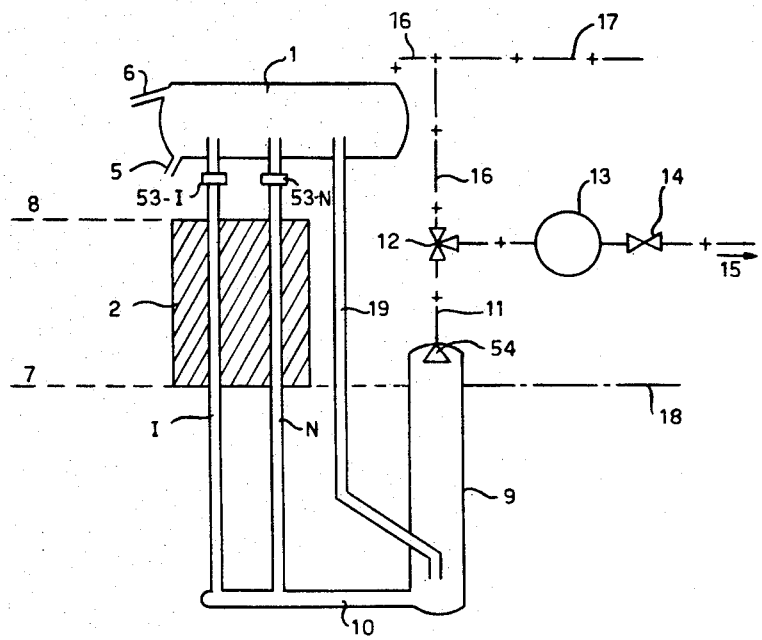
Figure 3:
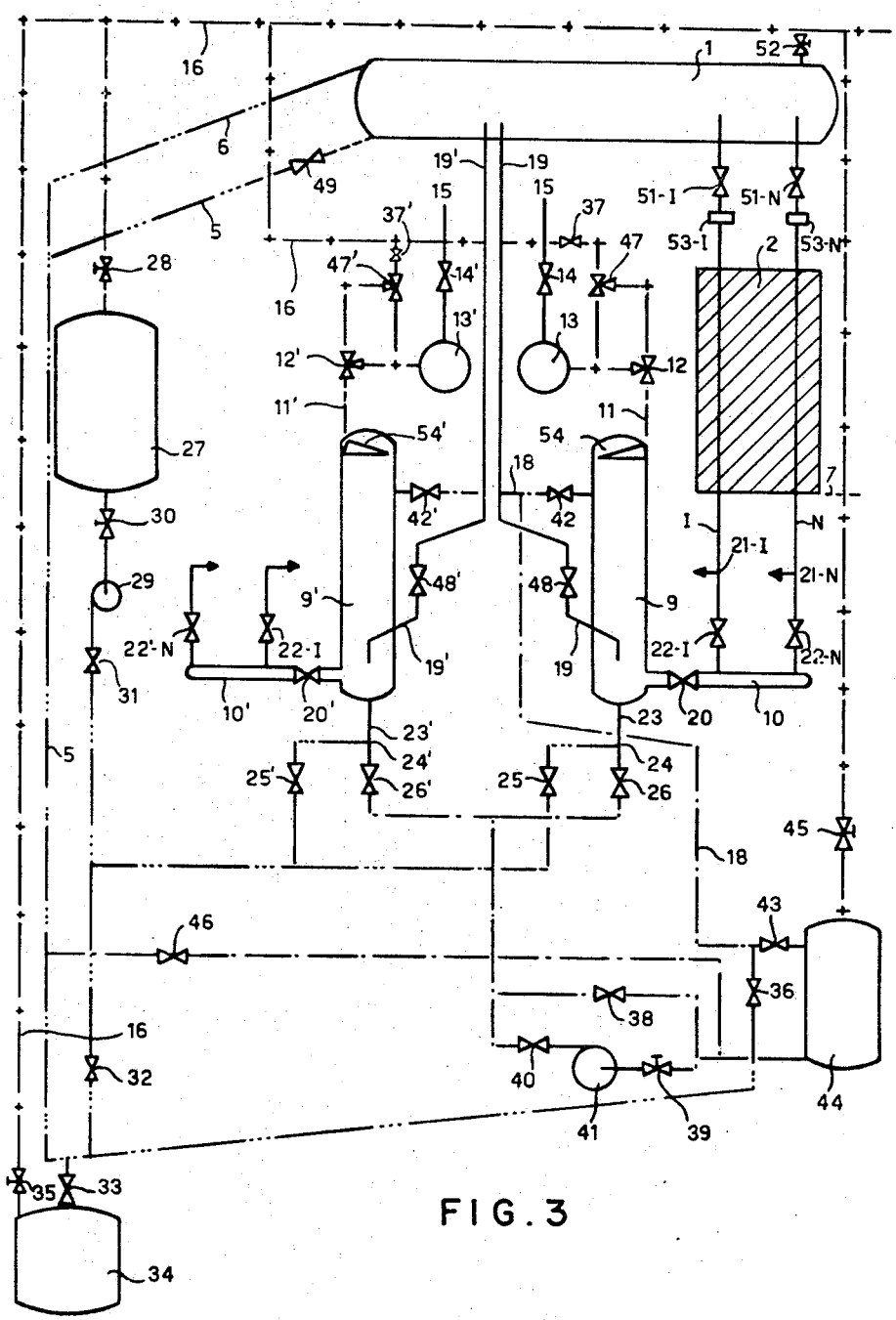
Figure 4:
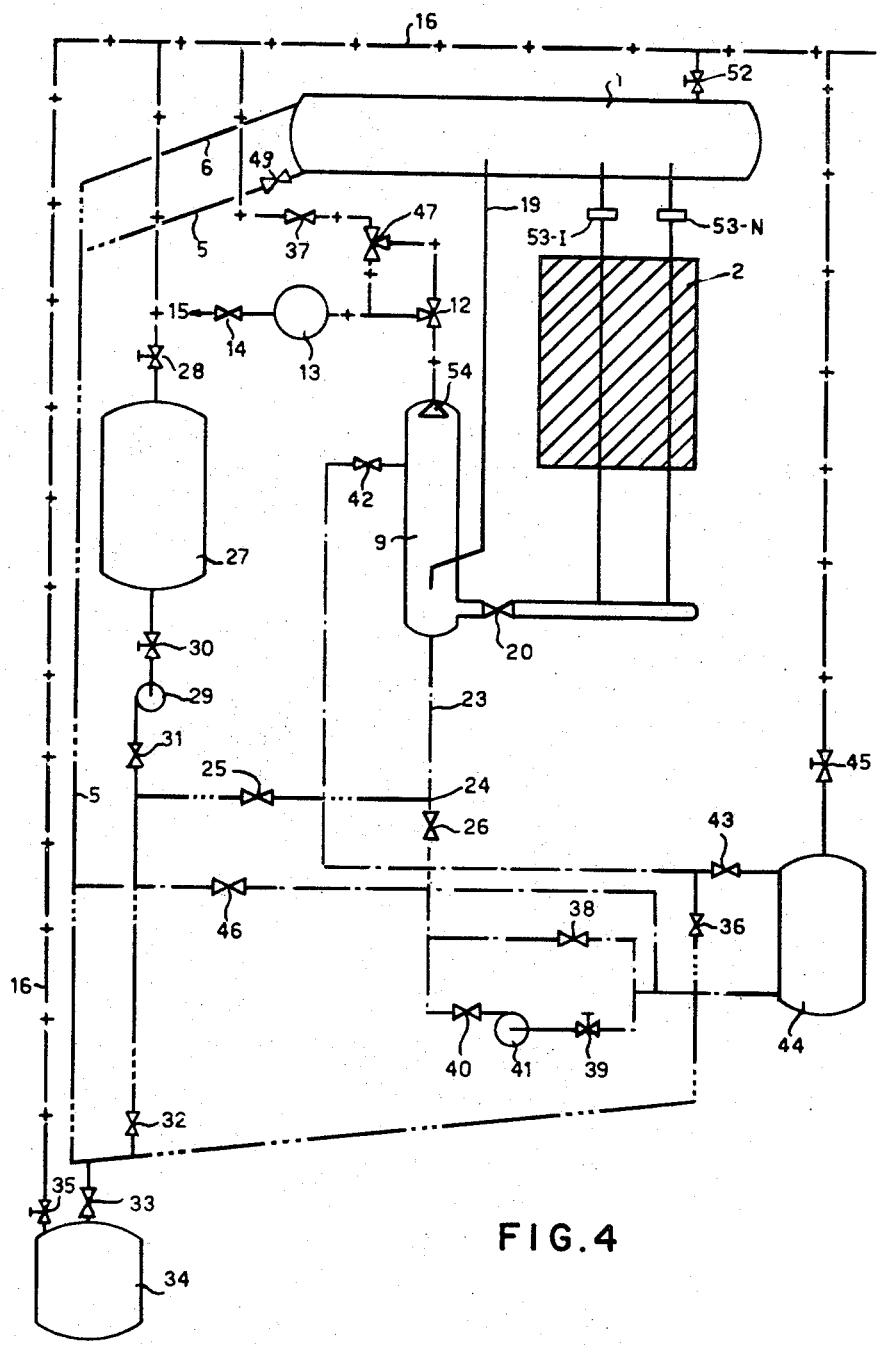

Some specific examples of the invention will now be described with reference to the accompanying diagrammatic drawings, in which:

FIGURE 1 is a vertical section through the top header of a system according to the invention, FIGURE 2 is a diagram showing the operating principle of the system, FIGURES 3 and 4 are general diagrams of two variants of the system of safety rods according to the invention.

The figures only show the elements necessary to an understanding of the invention, and the corresponding elements of these figures have the same reference numbers.

FIGURE 1 shows an essential item of equipment for the implementation of the invention, namely a top header having penetrating tubular rods, whereby one or several rods and certain parts of their circuit can be washed, that is to say a stream of washing liquid, for example water with which other substances may be mixed, can be passed through them, while the ractor can still be stopped, since a solution of a neutronic poison can still be introduced into a sufficient number of rods held in reserve.

The top header according to the invention is disposed above the reactor core indicated at 2. It is in the form of a vessel 1 connecting the top ends of the hollow rods I, II . . . N coming from the reactor core 2. The poison solution and washing liquid are introduced into the rods I, II . . . N from below the reactor core. The rods enter the header 1 for a short distance, and all stop on the same horizontal plane 3, while the bottom 4 of the conduit 1 has a slight slope, so that the washing liquid spurting into the collector through the top ends of the rods to be washed can be drained towards the bottom drainage orifice 5. Thus, the washing liquid cannot enter the other rods, which are held in reverse in case the reactor should have to be stopped, or are already filled with poison solution. The top collector also has an an optional addition, a top drainage pipe 6.

FIGURE 2 shows the general principle of the invention. The system shown is used for introducing poison solution quickly into the rods from bottom to top from an accumulator.

The driving power used to inject the poison solution into the rods I, II . . . N is supplied by the action of a pressure gas, for example helium, on the free level of the solution in a simple accumulator or reservoir 9 communicating with the rods by means of a bottom header 10.

The poison solution, which is normally at the level 7 in the rods, or just below the level of the reactor core, can be driven quickly through the rods to the level 8, which is slightly above the active zone of the reactor; the solution being slowed down and stopped by means of hydrodynamic brakes 53 I, II . . . N. These brakes do not interfer with the circulating, washing and emptying operations.

A conduit 11 opens into the top of the reservoir 9; this conduit 11 conveys the pressure driving gas arriving through a three-way control valve 12 from an accumulator 13 fed by means of a valve 14 with pressure gas from a source 15 (not shown). The third way of the valve 12 communicates with the top header 1 by means of a conduit 16, a branch 17 of which is connected to a low pressure P0, which is, for example, slightly higher than atmospheric pressure.

The reservoir or accumulator 9 has a valved overflow pipe 18 at the level 7, and also a means 54 for distributing the gas uniformly over the free surface of the solution, and a tube 19, which passes outside the reactor core and of which the base is at a higher level than that of the bottom header and of the bases of the rods. During the normal operation of the reactor, the three-way valve 12 causes the top header 1 and the top of the accumulator 9, which is thus at the pressure P0, to communicate with each other. The poison solution is therefore under balanced pressures and reaches the level 7 everywhere in the rods and the accumulator 9, and it cannot ascend in the rods. The valve 12 is held in this position by electrical, pneumatic or hydraulic means and is releasable by a signal to the holding means. The signal merely permits the valve 12 to change over and puts the solution accumulator 9 into communication with the gas accumulator 13, in which there is a pressure P1 higher than P0, so that the solution is driven through the rods. The gas inlet 14 being closed, the gas expands progressively; the poison-solution level falls in the accumulator 9, and rises in the safety rods. If the top header and the accumulator were only connected by the rods, gas would ultimately bubble through the latter when the level of the poison solution in the accumulator 9 reached the level of the bottom header 10 and of the bottom ends of the rods. The tube 19, termed the bubbling tube, obviates this drawback: the excess gas is removed through this tube and only poison solution passes through the rods.

The foregoing description shows that the system for the injection of poison solution based on the use of an accumulator and bubbling tube results in good reproducibility of the volume driven. The liquid level varies between two extreme, precisely controllable limits, and these limits cannot be exceeded.

Bubbling of the driving gas in the rods, which is extremely undesirable from the neutron point of view, is impossible; nor can poison solution rise in the circuit of the driving gas.

It should also be noted that the valve 12 is fitted "fail safe," that is to say, when it is in its normal, non-energized state, it brings the gaseous atmosphere of the accumulator 9 to the driving pressure of the gas accumulator. When the reactor is operating normally, with the safety rods empty and the accumulator 9 at the pressure P0, the valve 12 is energized. If the current or actuating signal should fail, so that the valve-energizing current is cut off, the valve returns to its normal position, and the rods are filled with poison solution.

The above-mentioned provision, in a system as described with reference to FIGURE 2, of a valve at the bottom of each rod and of conduits connected to those rods above the level of the valves enables certain rods to be washed while the others are kept available for the introduction of poison. It suffices for this purpose to close the valves of the rods to be washed and to circulate the washing liquid. But this method, which has the attractiveness of simplicity, does not permit the washing of the bottom header 10 or the accumulator 9 while the system remains available for stopping the reactor. The great simplicity and low cost of the accumulator 9, however, permit the production without undue inconvenience of systems using two or more of these, so as to avoid the above-mentioned drawback.

FIGURE 3 shows one of these systems which uses a top header entered by rods and two bubbling-tube accumulators. Each of these accumulators 9 or 9' is substantially similar to the one in FIGURE 2. It communicates with its bottom header 10 or 10' through a valve 20 or 20'. Each of the rods I . . . N communicates with each of the bottom headers by means of a branch 21–I . . . 21–N and a valve 22'–I . . . 22'–N.

A pipe 23 or 23' opens into the bottom of each of the accumulators 9 and 9'; these pipes 23 or 23', by a branch 24 or 24' and a valve 25 or 25', or a valve 26 or 26', are operable to cause their accumulators to communicate:

(a) By means of the valve 25 or 25', with a washing circuit (shown by a line consisting of a dash followed by three dots) comprising:

A reservoir 27 for storing washing liquid, for example pure water or water with which other substances have been mixed, the top of which may be brought to the pressure P0 by means of a valve 28;

A pump 29 between two valves 30 and 31;

Two valves 32 and 33;

A reservoir 34 for washing residues, the top of which may be brought to the pressure P0 by means of a valve 35;

A valve 36;

A valve 49 on the drainage pipe of the top header.

(b) By means of the valve 26 or 26' with a poison solution circuit (shown by a line composed of a dash and a dot) comprising:

Valves 38, 39 and 40, and a pump 41;

The overflow conduit 18 with valves 42 and 42', and a valve 43;

A reservoir 44 for the storage of poison solution, the top of which may be brought to the pressure P0 by means of a valve 45;

A valve 46 between the drainage conduit 5 of the top collector and the pump 41.

Each rod I–N has a valve 51–I to 51N between the reactor core and the top header, and a braking means 53–I to 53N, which has already been mentioned.

The accumulators 9 and 9' have a bubbling tube 19 or 19' with a valve 48 or 48'.

The inlet 11 or 11' of the driving gas, such as helium, opens into the top of each of the accumulators 9 or 9'. These inlets form part of a circuti similar to the one described with reference to FIGURE 2, but have a simple valve 37 or 37' and a three-way valve 47 or 47' in series with valve 12 or 12' for additional reliability. When the reactor is operating normally, the three-way valves of the gas circuit are energized, and the valves 37 and 37' are open, so that the accumulators are brought to the pressure P0. A signal for actuating the rods causes the energizing current to be cut off, and the two valves 12 and 47, or 12' and 47' resume their inoperative position, bringing the atmosphere of the poison-solution accumulator 9 or 9' to the pressure of the gas accumulator 13 or 13'. It will be seen in FIGURE 3 that if either one of the valves 12 or 47, or 12' or 47' should jam, communication would still take place between the driving pressure of the gas and the poison accumulator, which would be separated from the system having the pressure P0. It is very rare for a valve through which very pure inert gas passes to jam, and so this arrangement may be said to offer maximum reliability. The "fail safe" disposition of the valves of the gas circuit also makes for optimum safety.

The system that has just been described is very flexible and varied in use. This may be seen from a study of some examples of operation.

When the reactor is operating normally, one of the accumulators, for example 9, has been retained by the operator to enable the reactor to be stopped if necessary. All the liquid valves corresponding to the accumulator 9 are in the normal, that is to say the open, position. For the same principle applies to the liquid valves as to the gas valves. They also have a mechanism for locking them in the closed position. The accumulator 9' is isolated by closing and locking the valves 22'–I, . . . 22'–N and 48'. Locking them ensures that they preserve their position in the case of introduction through the accumulator 9.

In the case of the collective introduction of the rods, a signal causes the valves 12 and 47 to change over. The pressure of the gas drives the solution out of the accumulator 9 towards the rods. The accumulator 9' is isolated, and so it is not affected by this operation.

In the case of the collective emptying of the rods, the gas accumulator 13 must first be recharged. For this purpose, the solution accumulator is isolated by closing the valve 37; then the valves 12 and 47 are re-energized, and 14 is opened to admit the high-pressure gas. When the pressure P1 has been reached, that is to say when the equipment is ready for a fresh operation, the valve 37 is opened; this valve has a constriction whereby the rods can be emptied at a desired rate; the rods are emptied by gravity and the solution resumes the level 7 everywhere.

In the case of emptying of the rods one by one, the gas accumulator is first recharged; then intercommunication between rods is interrupted by closing the valves 22. All that has to be done to empty the rod I is to open 22–I, and the rod is emptied by gravity according to the rate established by the valve 51–I.

In the case of the washing of an accumulator, for example 9, and rods during the normal operation of the reactor, the equipment must first be emptied; this is done by opening the valves 38 and 26, after closing the valves 22 and opening 48' and 22'–I . . . 22'–N to bring the accumulator 9′ into service. When emptying is complete, 31 and 25 are opened to admit the washing water, which rises and flows to the reservoir 34 through the valves 32, 36 and 33.

When the accumulator is washed, 42, 36 and 37 are closed 22–I . . . 22–N and 49 are opened, and water spurts into the top header, runs into the bottom of the latter, and is therefore unable to redescend through the other rods; it is then discharged through 49 and 33. For each of the other rods, it suffices to close its valve 22′ and open its valve 22. The bubbling tube is opened in the same manner.

If an introduction signal occurs during the washing of a rod, the accumulator 9′ drives its solution into the N–1 other rods, which are sufficient for stopping the reactor. At the same time all the valves of the washing circuit close and the pump stops. The operator can then empty the washing water from the rod and introduce poison solution into it.

When a valve 22 is opened to wash the corresponding rod, the washing water entrains the quantity of solution between that valve and the level 7. When all the rods have been washed, the solution therefore returns to a level below 7, the quantity of solution in the accumulator 9′ being sufficient to ensure stopping. The accumulator 9 is then emptied by opening 25 and 32, and it is filled with poison solution as far as the overflow 18, 42.

The foregoing examples do not exhaust the possibilities of the system. Many other operations can be carried out.

The system that has just been described is very flexible. It is preferably used with small reactors that have relatively few safety rods. In the case of a larger reactor, a slightly different method may be adopted, using fewer valves such as 22 and 22′, which are very expensive. It suffices for this purpose to distribute the rods in different groups, each group having the same number of rods. Each of these groups is connected to its own accumulator 9 and bottom header 10.

FIGURE 4 shows a system of this kind, in which a single group of bars and its poison-solution accumulator are represented. The general scheme differs slightly from the one in FIGURE 3 in that the rod circuit, which only has a single valve 20, has been simplified. The description of this system therefore differs little from the description with reference to FIGURE 3, and will not be repeated here. The system in FIGURE 4 requires, of course, that an accumulator and its rods form a unit, which is brought into operation or brought out of operation as such. When an accumulator and its rods are washed, for example, the number of the other accumulators and their rods must be enough to ensure the stopping of the reactor.

The invention that has just been described with reference to the accompanying figures is particularly suitable for the emergency stopping of a reactor. It responds to a large number of requirements, which are satisfied simultaneously.

(I) The poison solution is introduced very quickly into the reactor core, the speed of introduction depending on the geometry of the reactor and the pressure applied.

(II) The poison solution is introduced with maximum reliability, since:
  (a) This operation is carried out with the smallest possible number of operating valves (only the valves 12 and 47);
  (b) These valves do not act on the liquid poison, but on the gas, so that risks of jamming are greatly reduced;
  (c) These valves are of the "fail safe" type, that is to say they are open in the absence of actuating energy, whether they are electric or pneumatic;
  (d) The valves of the liquid circuits are also of the "fail safe" type.

(III) The system enables the reactor to be emergency-tripped at any time, the introduction of the poison solution to all the rods being possible at any time.

(IV) The system enables the reactor to be started up again very quickly after a brief hold-up, by the collective emptying of the rods.

(V) The rods can be filled or emptied individually or in groups, with the additional safety feature that the operation for isolating a rod or group of rods can only be released manually. This possibility of isolating one or several rods means that the normal operation of the reactor (divergence, power operation, stopping) is not disturbed by damage to a single rod or to a single group of rods. Another advantage of this possibility is that any part of the circuit can be repaired whether the other rods are filled or not.

(VI) The system makes possible the filling or even delayed filling of rods that have remained empty accidentally, either by accidental plugging, or by failure of the actuating systems to operate in the case of single actuation or actuation by groups. Filling can then be carried out through the top header.

(VII) The system can be recharged collectively after stopping, so that it can be made ready for a fresh filling without delay.

(VIII) The system enables the rods to be washed one by one or by groups during the normal operation of the reactor, and this operation permits the filling of the other rods without risk to safety It also enables washing to take place after the reactor has stopped, provided that the circulation of poison in the other rods can be dispensed with.

(IX) The system enables the "rod filled" and "rod emptied" positions to be signalled with the greatest possible safety by using all-or-nothing probes situated approximately at levels 7 and 8 and detecting the presence or absence of liquid at these levels.

What we claim is:

1. A system of hollow, fluid-conducting safety rods for nuclear reactors comprising in combination with said reactor a plurality of hollow safety rods passing vertically through the reactor core and opening at both ends thereof, a top header and a bottom header respectively mounted on the top and bottom of said reactor core, said headers being connected to each of said rods, a fluid accumulator, means connecting said headers to said accumulator, means for selectively pressurizing said accumulator to drive fluid therefrom into said bottom header and through said rods, hydrodynamic braking means at the upper end of said rods for controlling the flow of fluid therethrough, said means connecting said accumulator to said top header being conduit means entering said accumulator above the level of said bottom header whereby bubbling in the hollow safety rods will be prevented, a poison fluid reservoir, a washing liquid reservoir, means including valve means and pump means for selectively pumping said poison fluid and said washing liquid into said accumulator, said headers, and said rods and controlling the flow therethrough, a washing liquid residue reservoir connected to collect the washing liquid after it has passed through said accumulator, said headers, and said rods, means connecting the top header to said poison fluid reservoir whereby excess poison solution passing through said accumulator and said pipes is returned to said reservoir, the ends of said rods in said top header being so arranged that fluid passing through any single rod will not flow into any of the other rods, said rods be sufficient in number so that the reactor may be stopped by filling only some of said rods with a poison fluid.

2. A system according to claim 1 comprising at least two fluid accumulators and bottom headers, valve means on each said rod between the outlet above the reactor core and the top header, conduit means connecting the bottom of each rod to each of said bottom headers, valve means in said conduit means connecting each of said rods to each of said bottom headers, whereby each rod can be selectively brought into communication with each said accumulator so that one accumulator and a selected number of rods can be washed while the other accumulator and the remainder of said rods remain available for the introduction of poison fluid into said remaining rods to insure stopping of the reactor.

3. A system as claimed in claim 1 in which said plurality of rods are distributed in groups having equal numbers of rods, a bottom header operatively connected to each of said groups of rods, an accumulator connected to each of said bottom headers, whereby an individual accumulator, bottom header and group of rods can be washed while the remaining accumulators, bottom headers and groups of rods are available for and sufficient in number to insure reactor stopping.

4. A system as claimed in claim 1 in which said top header comprises a closed chamber into which the top ends of said rods penetrate a short distance, said rods terminating uniformly along a horizontal plane passing through said chamber, the bottom of said chamber being inclined so that liquid entering therein from said rods will be drained off towards a bottom discharge orifice, said top header having a top and a bottom discharge pipe.

5. A system as claimed in claim 1 in which said accumulators comprise a reservoir having at the top end thereof an overflow discharge pipe, said discharge pipe being at the level of entry of the rods below the reactor core and above the level of an overflow, means for distributing fluid entering said reservoir uniformly over the surface of the fluid therein, an inlet pipe having a three-way valve therein communicating selectively with pressurized driving gas source and with the top header, outlet conduit means connecting the bottom of said reservoir to said bottom header, a tube passing outside the reactor core with its upper end terminating in the top header and its bottom end connected to said reservoir above the level, said outlet conduit thereby providing a bypass for said driving gas from said accumulator to said top header without passing through said bottom header, rods and reactor.

6. A system as claimed in claim 1 in which all said valve means are mounted in a fail-safe condition whereby deenergization of said valves places them in condition for passage of poison fluid to the rods thereby stopping said reactor.

References Cited
UNITED STATES PATENTS

| 2,874,109 | 2/1959 | Cooper | 176—22 |
| 2,917,444 | 12/1959 | Dreffin | 176—22 |
| 2,982,712 | 5/1961 | Heckman | 176—22 |

FOREIGN PATENTS

| 897,889 | 5/1962 | Great Britain. |
| 921,447 | 3/1963 | Great Britain. |
| 1,206,101 | 12/1965 | Germany. |

BENJAMIN R. PADGETT, *Primary Examiner.*

H. E. BEHREND, *Assistant Examiner.*